United States Patent
Kirita et al.

(10) Patent No.: US 10,156,916 B2
(45) Date of Patent: Dec. 18, 2018

(54) INPUT DEVICE IDENTIFICATION METHOD, INPUT DEVICE IDENTIFICATION APPARATUS, AND INPUT SYSTEM

(71) Applicant: KOTO CO., LTD., Kyoto (JP)

(72) Inventors: Hiroshi Kirita, Kyoto (JP); Kazuhiro Kubota, Kyoto (JP)

(73) Assignee: KOTO CO., LTD., Kyoto (JP)

( * ) Notice: Subject to any disclaimer, the term of this patent is extended or adjusted under 35 U.S.C. 154(b) by 251 days.

(21) Appl. No.: 15/361,146

(22) Filed: Nov. 25, 2016

(65) Prior Publication Data

US 2018/0150144 A1    May 31, 2018

(51) Int. Cl.
    G06F 3/045    (2006.01)
    G06F 3/038    (2013.01)
    G06F 3/044    (2006.01)
    G06F 3/0354   (2013.01)
    G06F 3/041    (2006.01)

(52) U.S. Cl.
    CPC ............ *G06F 3/038* (2013.01); *G06F 3/0354* (2013.01); *G06F 3/044* (2013.01); *G06F 3/0416* (2013.01)

(58) Field of Classification Search
    CPC ...... G06F 3/0354; G06F 3/038; G06F 3/0416; G06F 3/044
    See application file for complete search history.

(56) References Cited

U.S. PATENT DOCUMENTS

2016/0001180 A1*  1/2016  Shi .................. G06F 3/0487
                                                    463/32
2016/0062480 A1*  3/2016  Ogawa ............. G06F 3/033
                                                    345/156

FOREIGN PATENT DOCUMENTS

JP    2012-008893 A    1/2012
JP    2014-215980 A    11/2014

* cited by examiner

*Primary Examiner* — Insa Sadio
(74) *Attorney, Agent, or Firm* — Fitch, Even, Tabin & Flannery, LLP

(57) ABSTRACT

An input device identification method is applicable to an input device including at least three contact surfaces. The input device identification method includes the steps of: storing distances between contact surfaces (s01); acquiring coordinates of respective contact surfaces of the input device placed on the touch panel (s02); calculating distances between the acquired coordinates (s03); calculating a similarity ratio between a shape formed by the respective acquired coordinates and a shape formed by the respective contact surfaces on the basis of the calculated distances and the stored distances (s04); and identifying the input device by comparing the stored distances and the calculated distances after converting either one of the stored distances and the calculated distances to the same scale as the other on the basis of the similarity ratio (s05).

6 Claims, 13 Drawing Sheets

Contact portion coordinates detected by model A

Contact portion coordinates detected by model B

Contact portion coordinates detected by model C

Contact portion coordinates detected by model D

Contact portion coordinates detected by model E

INPUT DEVICE IDENTIFICATION METHOD, INPUT DEVICE IDENTIFICATION APPARATUS, AND INPUT SYSTEM

BACKGROUND

Technical Field

The present invention relates to an input device identification method, an input device identification apparatus, and an input system.

Related Art

A smart device, such as a smartphone or a tablet having a touch panel adapted to detect a position on a panel surface touched by a user with his/her fingertip or the like as a coordinate, is known. Examples of the touch panel include touch panels that perform coordinate detection based on the change in capacitance (i.e., capacitive touch panels) and can detect the coordinates of a plurality of contact portions.

In recent years, input devices for inputting a plurality of coordinates to the touch panel have been developed. Japanese Unexamined Patent Application Publication No. 2014-215980 A discloses a technique using such input devices. According to this technique, the type of an input device is identified on the basis of the positional relationship of coordinates inputted by the input device, thereby allowing an image and the like corresponding to the type of the identified input device to be displayed on a display screen of a smart device.

On the other hand, as smart devices have become more prevalent, various models with different screen sizes and different screen resolutions as shown in Table 1 have appeared on the market, so that users can own models that meet their needs. In Table 1, "Model" refers to the type of a commercially available smart device. The "Screen Size" refers to the size of the display screen of the smart device. The "Screen Resolution" refers to the total number of pixels on the display screen, which is represented by the number of pixels in a vertical direction×the number of pixels in a horizontal direction.

TABLE 1

| Model | Screen Size (inch) | Screen Resolution (pixel) |
|---|---|---|
| A | 4.3 | 1280 × 720 |
| B | 4.7 | 1334 × 750 |
| C | 5.0 | 1920 × 1080 |
| D | 5.5 | 1136 × 640 |
| E | 5.7 | 1280 × 800 |

In order to display a predetermined image on various display screens with different screen sizes and different screen resolutions, Japanese Unexamined Patent Application Publication No. 2012-008893 A discloses providing image data corresponding to the respective screen sizes and screen resolutions beforehand.

PRIOR ART DOCUMENTS

Patent Documents

[Patent Document 1] Japanese Unexamined Patent Application Publication No. 2014-215980 A

[Patent Document 2] Japanese Unexamined Patent Application Publication No. 2012-008893 A

SUMMARY

Specifications of a touch panel such as the panel size and the resolution in each of the above-described smart devices are determined according to display specifications such as the screen size and the screen resolution. Thus, in models with different display specifications, the specifications of touch panels are also different. Accordingly, even when the same input device is used, coordinates to be detected vary among these models. This may lead to failure to identify the input device.

One possible solution to this problem is to use an input device identification technique utilizing the idea disclosed in Japanese Unexamined Patent Application Publication No. 2012-008893 A, namely, providing image data corresponding to the display specifications beforehand.

Such an identification technique, however, still has a problem in that it is necessary to provide data corresponding to all models to which input devices are applicable. Besides, when a newly developed model employs display specifications different from the existing display specifications, a touch panel is also designed newly according to the display specifications. Thus, it becomes necessary to provide data corresponding to the new model. When it is impossible to provide data corresponding to the new model, input device identification cannot be achieved for the newly released model.

In view of the above situation, it is an object of the present invention to provide an input device identification method, an input device identification apparatus, and an input system that are compatible with various touch panel specifications and eliminate the necessity of providing data corresponding to the respective touch panel specifications.

In order to achieve the above object, a first aspect in accordance with the present invention provides an input device identification method applicable to an input device including at least three contact portions to be in contact with a touch panel. The input device identification method includes the steps of: storing a distance between two contact portions in the input device as a contact portion distance for each of a plurality of combinations made by selecting two contact portions from respective contact portions of the input device; acquiring coordinates of the respective contact portions of the input device placed on the touch panel; calculating a distance between acquired two coordinates as a coordinate distance for each of a plurality of combinations made by selecting two coordinates from respective acquired coordinates; calculating a similarity ratio between a shape formed by the respective acquired coordinates and a shape formed by the respective contact portions on the basis of the calculated coordinate distances and the stored contact portion distances; and identifying the input device in contact with the touch panel by comparing the stored contact portion distances and the calculated coordinate distances after converting either one of the stored contact portion distances and the calculated coordinate distances to the same scale as the other on the basis of the similarity ratio.

A second aspect in accordance with the present invention provides an input device identification apparatus applicable to an input device including at least three contact portions to be in contact with a touch panel. The input device identification apparatus includes: a memory unit configured to store a distance between two contact portions in the input device as a contact portion distance for each of a plurality of combinations made by selecting two contact portions from respective contact portions of the input device; an acquisition unit configured to acquire coordinates of the respective contact portions of the input device placed on the touch panel; a coordinate distance calculating unit configured to calculate a distance between two coordinates as a coordinate distance for each of a plurality of combinations made by selecting two coordinates from respective acquired coordinates; a similarity ratio calculating unit configured to calculate a similarity ratio between a shape formed by the respective acquired coordinates and a shape formed by the respective contact portions on the basis of the calculated coordinate distances and the stored contact portion distances; and an identification unit configured to identify the input device in contact with the touch panel by comparing the stored contact portion distances and the calculated coordinate distances after converting either one of the stored contact portion distances and the calculated coordinate distances to the same scale as the other on the basis of the similarity ratio.

A third aspect in accordance with the present invention provides an input system which includes: a computer with a touch panel; and an input device including at least three contact portions to be in contact with the touch panel. The computer includes: a memory unit configured to store a distance between two contact portions in the input device as a contact portion distance for each of a plurality of combinations made by selecting two contact portions from respective contact portions of the input device; an acquisition unit configured to acquire coordinates of the respective contact portions of the input device placed on the touch panel; a coordinate distance calculating unit configured to calculate a distance between two coordinates as a coordinate distance for each of a plurality of combinations made by selecting two coordinates from respective acquired coordinates; a similarity ratio calculating unit configured to calculate a similarity ratio between a shape formed by the respective acquired coordinates and a shape formed by the respective contact portions on the basis of the calculated coordinate distances and the stored contact portion distances; and an identification unit configured to identify the input device in contact with the touch panel by comparing the stored contact portion distances and the calculated coordinate distances after converting either one of the stored contact portion distances and the calculated coordinate distances to the same scale as the other on the basis of the similarity ratio.

When an input device is placed on a touch panel, the coordinates of respective contact portions are acquired. The shape formed by the respective coordinates is similar to the shape formed by the respective contact portions of the input device. On this account, the present invention calculates coordinate distances from the acquired coordinates, then calculates the similarity ratio between these shapes on the basis of the calculated coordinate distances and pre-stored contact portion distances, and identifies the input device on the basis of the similarity ratio. According to the present invention configured as above, input device identification is achieved by determining the similarity ratio every time an input device is placed on a touch panel. Thus, the present invention eliminates the necessity of providing data concealing screen resolutions and screen sizes beforehand, and enables input device identification compatible with various touch panel specifications.

DETAILED DESCRIPTION OF EMBODIMENTS

An embodiment of the present invention will be described below with reference to the drawings.

Figure 1:
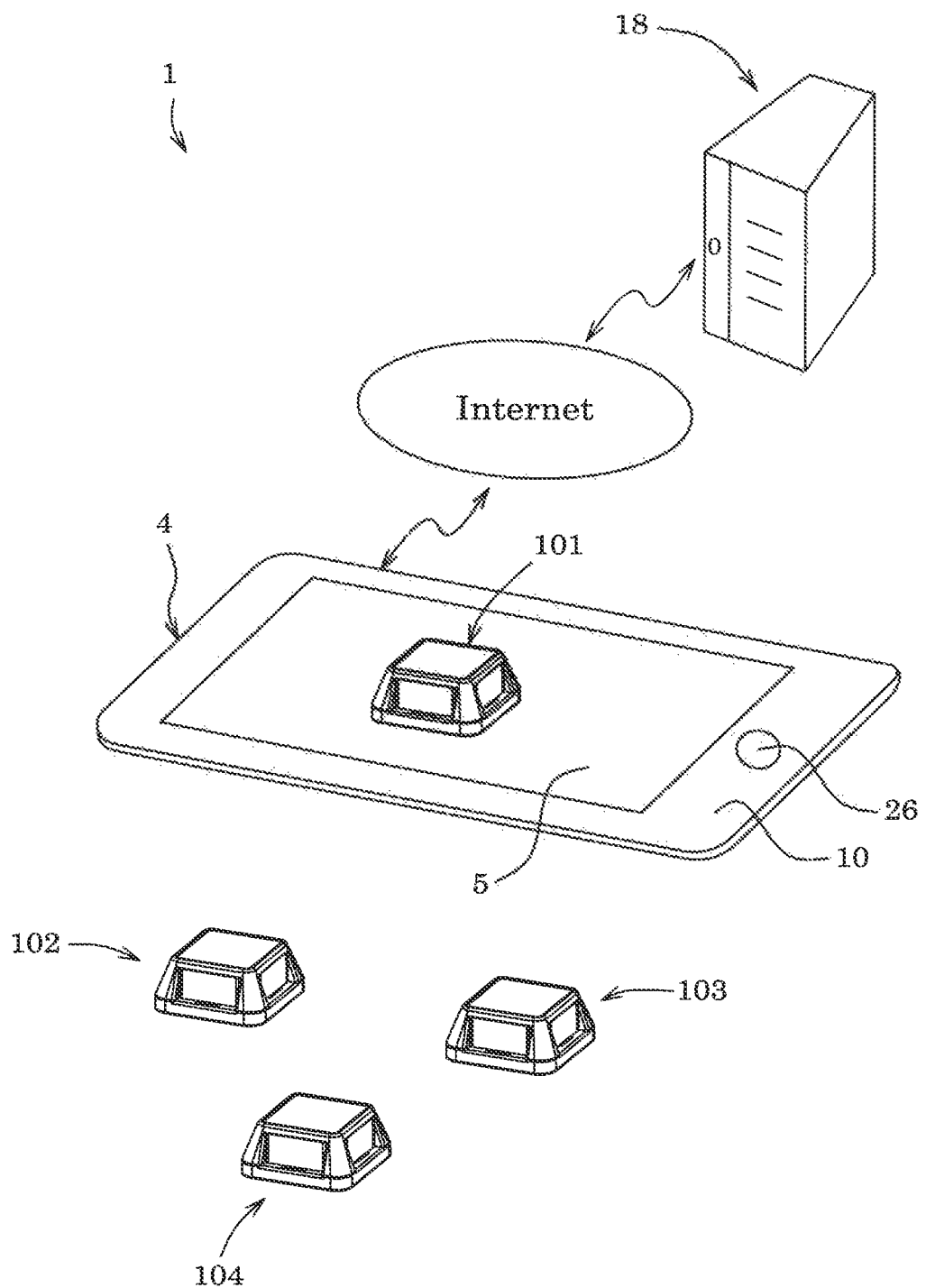
FIG. 1 is a schematic view of an input system according to an embodiment.
Figure 2:
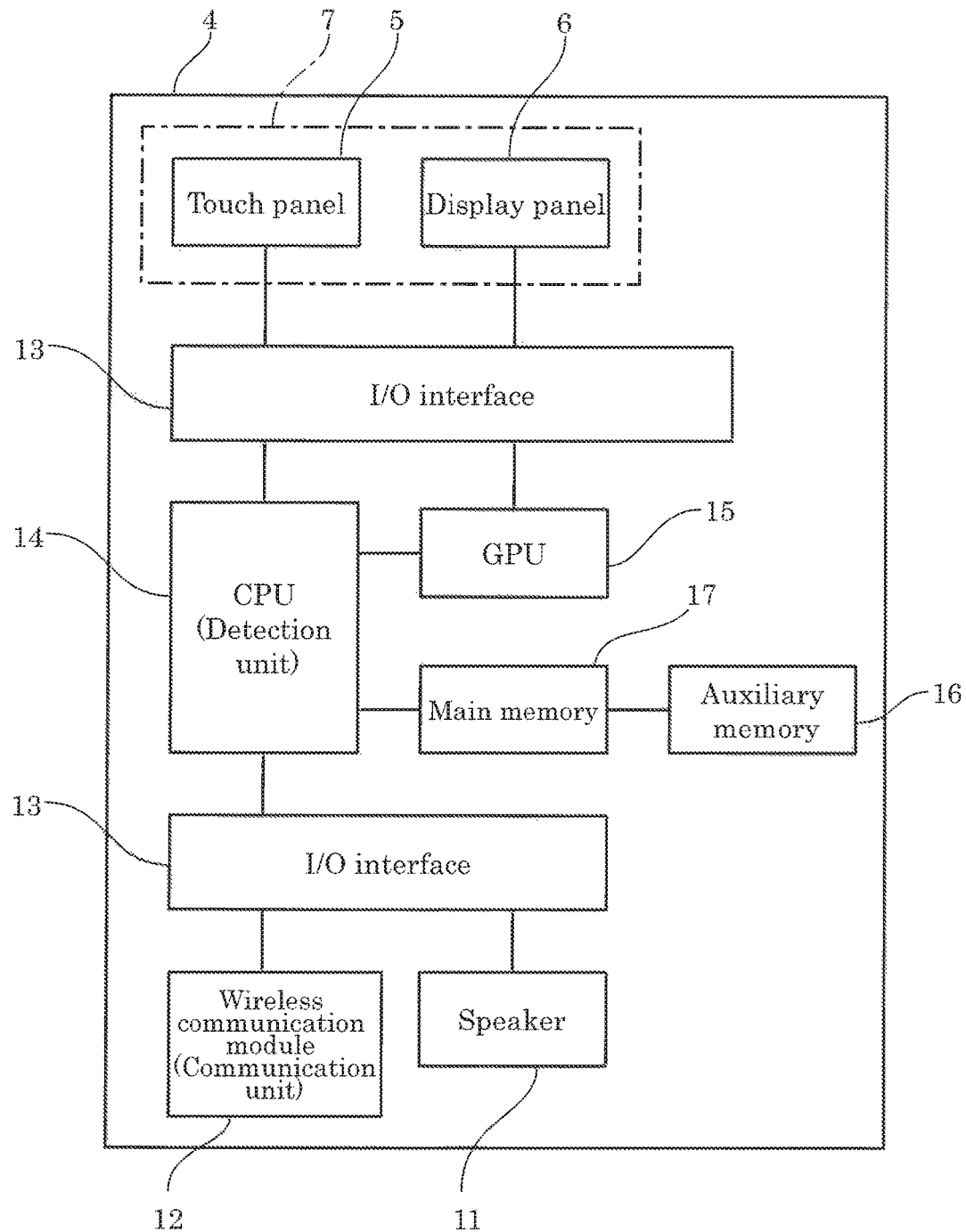
FIG. 2 is a block diagram showing the schematic configuration of a smart device used in the input system.

As shown in FIG. 1, an input system 1 according to the present embodiment uses a smart device 4, which is typically a smartphone or a tablet. The smart device 4 has a home button 26 at a housing end portion 10. As shown in FIG. 2, the housing of the smart device 4 includes, as built-in components, a speaker 11, a wireless communication module (communication unit) 12 for access to the Internet utilizing a wireless local area network (LAN) standard such as Wireless Fidelity (WiFi), and a power supply circuit (not shown) for supplying electric power to the respective electronic components. The speaker 11 and the wireless communication module 12 are controlled by a central processing unit (CPU) 14 via an input/output (I/O) interface 13. The CPU 14 executes an operating system (OS) of the smart device 4 and other application software stored in an auxiliary memory 16 via a main memory 17. Upon execution of the OS or the application software, the CPU 14 causes an image to be displayed on a display panel 6 via a graphics processing unit (GPU) 15. A touch panel 5 is overlaid on the display panel 6, and the display panel 6 and the touch panel 5 constitute a panel module 7. This panel module 7 is disposed on a surface side of the housing, and is fixed to the housing end portion 10. The touch panel 5 is also controlled by the CPU 14 via another I/O interface 13. The CPU 14 detects the coordinate of an object that has come into contact with the touch panel 5 on the basis of the change in capacitance caused on the touch panel 5. In other words, the CPU 14 serves as a detection unit for detecting coordinates.

Figure 3:
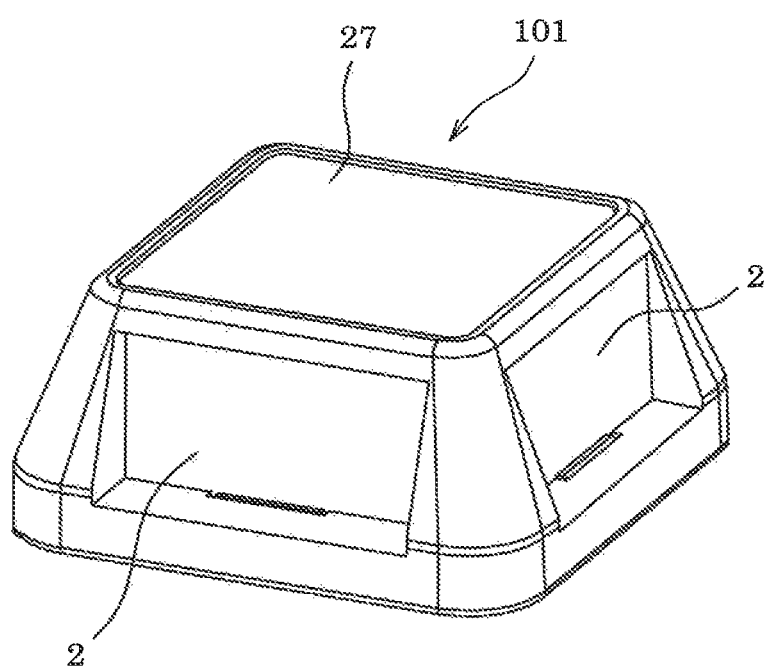
FIG. 3 is a perspective view from above of an input device used in the input system.

As shown in FIG. 1, in the present embodiment, a plurality of input devices 101, 102, 103, and 104 are used as input devices for inputting coordinates to the smart device 4 provided with the touch panel 5. The configurations of these input devices 101 to 104 will be described with reference to FIGS. 3 to 5, which show the input device 101 as a representative example. The input device 101 is in a block shape, and has side surfaces 2 and a bottom surface 3. Four contactors 9a to 9d are provided on the bottom surface 3. The contactors 9a to 9d are columnar protrusions, and they protrude from the bottom surface 3 with the same protruding length. The side surfaces 2, the bottom surface 3, and the contactors 9a to 9d are molded integrally using an electrically conductive member, so that they are electrically connected to each other. Each of the input devices 101 to 104 has an intended use unique thereto, and the use is displayed on an upper surface 27 of each of the input devices 101 to 104. These input devices 101 to 104 are configured so that the contactors 9a, 9b, and 9d are disposed at the same positions on their bottom surfaces 3, whereas the contactors 9c are disposed at different positions on their bottom surfaces 3.

Figure 4:
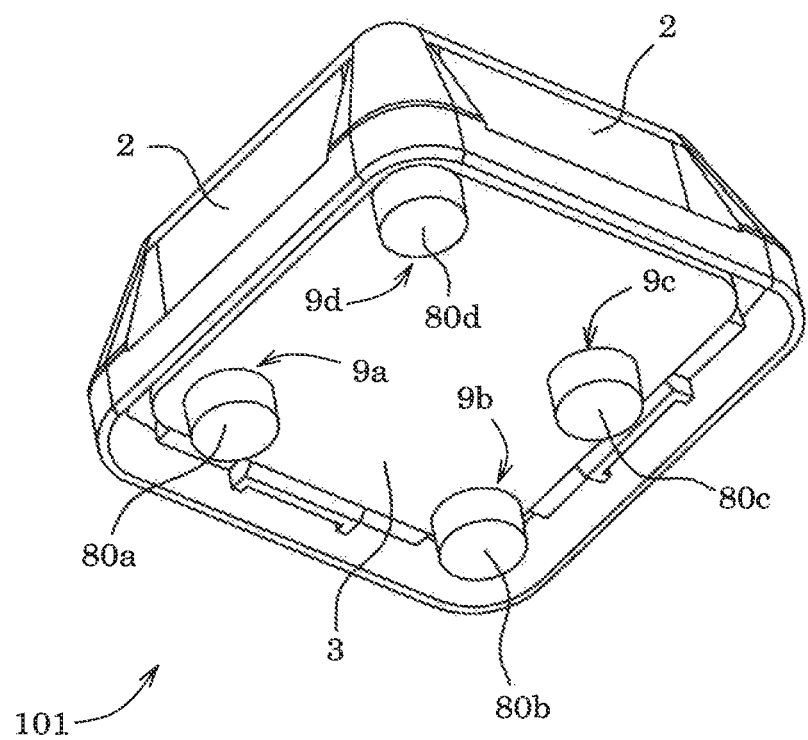
FIG. 4 is a perspective view from below of the input device used in the input system.

As shown in FIG. 1, when one input device 101 is placed on the touch panel 5 of the smart device 4, front end surfaces (hereinafter referred to as "contact surfaces 80a to 80d") of the contactors 9a to 9d shown in FIG. 4 come into contact with the touch panel 5. Thus, in the present embodiment, the contact surfaces 80a to 80d of the contactors 9a to 9d are the contact portions to be in contact with the touch panel 5. When a user pinches the side surfaces 2 of the input device 101 placed on the touch panel 5, change in capacitance is caused in portions of the touch panel 5 in contact with the input device 101, owing to the electrical connection between the side surfaces 2 and the contact surfaces 80a to 80d.

Figure 5:
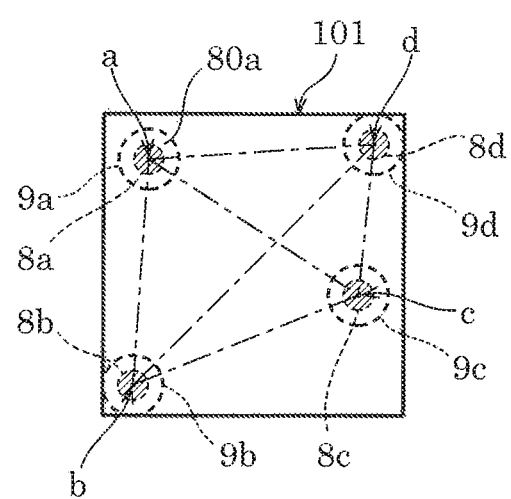
FIG. 5 is a plan view showing only the positional relationship of contactors when the input device used in the input system is viewed from above.

Upon detection of the change in capacitance, the CPU 14 of the smart device 4 shown in FIG. 2 causes a touch event, thereby executing an operation for detecting the coordinates of the contact surfaces 80a to 80d. In this manner, the CPU 14 serves as the detection unit for detecting coordinates. In the present embodiment, as shown in FIG. 5, coordinates corresponding to the positions of the centers a to d of the contact surfaces 80a to 80d (hereinafter referred to as "contact portion coordinates") on the touch panel 5 are detected. In practice, not only the centers a to d of the contact surfaces 80a to 80d but also points present in predetermined regions around the centers a to d (the predetermined regions are hereinafter referred to as "coordinate detection regions 8a, 8b, 8c, and 8d") may be detected as the contact portion coordinates.

Figure 6:
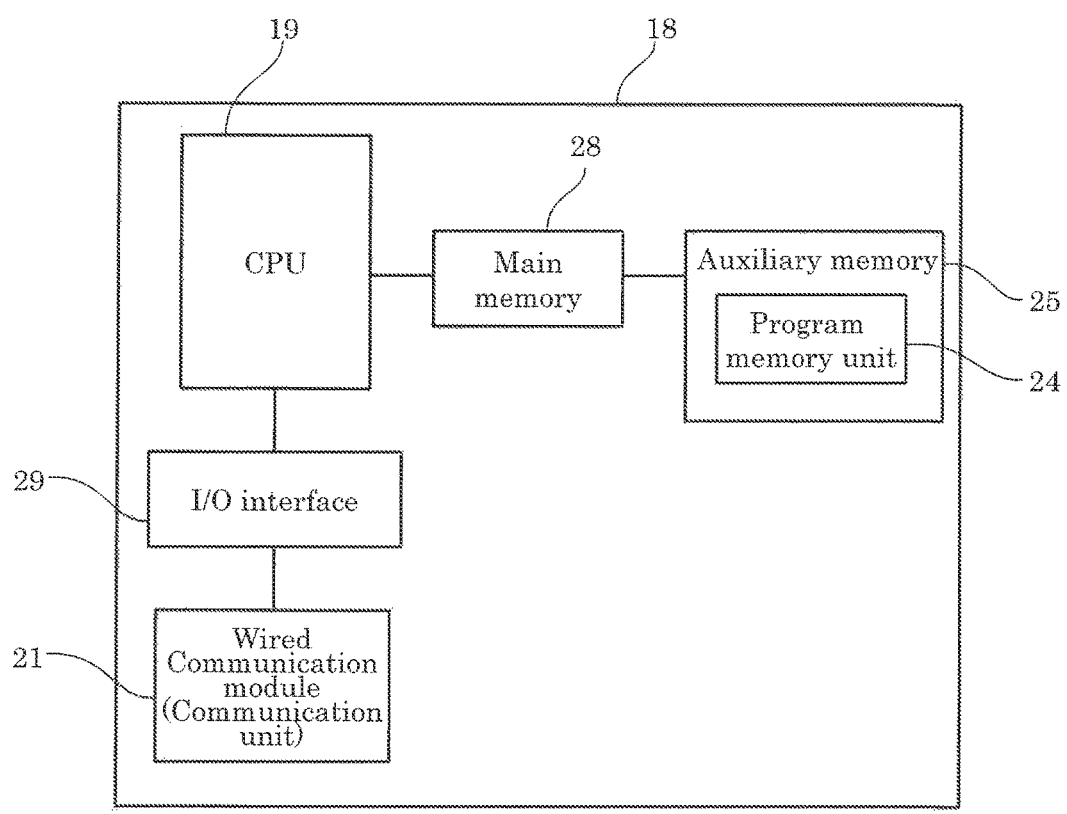
FIG. 6 is a block diagram showing the schematic configuration of a server used in the input system.

The smart device 4 described above serves as a client, and as shown in FIG. 1, the smart device 4 can communicate with a server 18 via the Internet. The server 18 identifies each of the input devices 101 to 104 (the server is also hereinafter referred to as "input device identification server"). As shown in FIG. 6, the server 18 includes, in addition to a wired communication module (communication unit) 21 for access to the Internet, a central processing unit (CPU) 19 for controlling the wired communication module 21 via an I/O interface 29, a main memory 28, and an auxiliary memory 25. The CPU 19 executes a program stored in the auxiliary memory 25 via the main memory 28.

Figure 7:
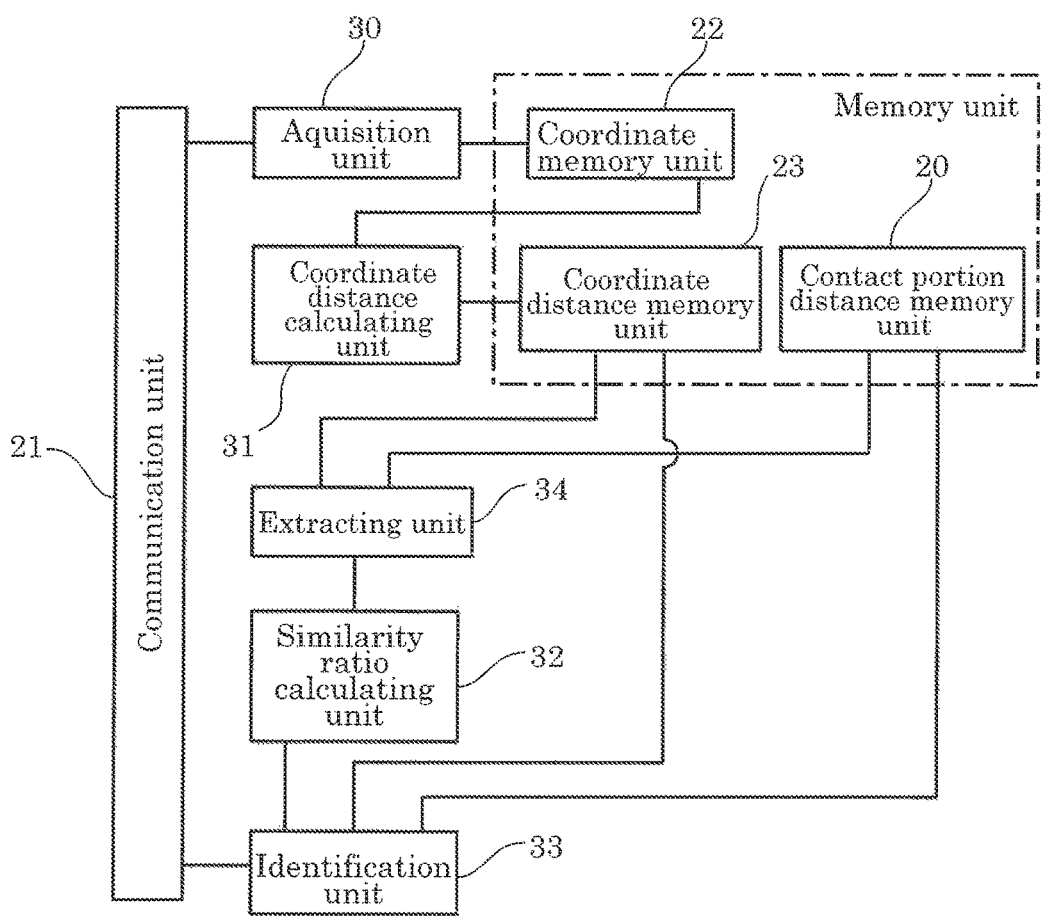
FIG. 7 is a functional block diagram of the server.

The auxiliary memory 25 pre-stores the distances between the contact surfaces 80a to 80d (hereinafter referred to as "contact portion distances") regarding each of the input devices 101 to 104. The contact portion distance means the actual measured value obtained by measuring the distance between the center of one contact surface (e.g., the center a of the contact surface 80a) and the center of another contact surface (e.g., the center c of the contact surface 80c), or an index value indicating the distance. In other words, the contact portion distance is the length of a line segment connecting two centers selected from the centers a to d of the contact surfaces 80a to 80d with a straight line. In the present embodiment, the auxiliary memory 25 stores the contact portion distances for all possible combinations made by selecting two contact surfaces from the four contact surfaces 80a to 80d. That is, the auxiliary memory 25 stores the lengths of line segments ab, bc, cd, da, ac, and bd included in a plane figure formed by connecting the centers a to d of all the contact surfaces 80a to 80d. These contact portion distances are associated with identification information. The identification information is information for distinguishing among the input devices 101 to 104, and each of the input devices 101 to 104 has identification information assigned uniquely thereto. It is preferable from the viewpoint of performing calculation to be described below that among the plurality of contact portion distances, the contact portion distance with the greatest length (the length of the line segment bd) is stored in duplicate as the longest contact portion or stored separately from the other contact portion distances. In this manner, the auxiliary memory 25 serves as a contact portion distance memory unit 20 for storing contact portion distances (FIG. 7).

The auxiliary memory 25 also stores an input device identification program. That is, the auxiliary memory 25 serves as a program memory unit 24 for storing the input device identification program. The input device identification program defines information processing operations for identifying the types of the input devices 101 to 104. By executing the input device identification program, the CPU 19 serves as the following sections as shown in FIG. 7: an acquisition unit 30 for acquiring contact portion coordinates; a coordinate distance calculating unit 31 for calculating the distances between the contact portion coordinates (hereinafter referred to as "coordinate distances"); an extracting unit 34 for extracting one contact portion distance and one coordinate distance; a similarity ratio calculating unit 32 for calculating a similarity ratio; and an identification unit 33 for identifying the input devices 101 to 104. The main memory 28 serves as a coordinate memory unit 22 for storing the contact portion coordinates acquired from the smart device 4 and a coordinate distance memory unit 23 for storing the calculated distances between the contact portion coordinates.

The distance between the contact portion coordinates (hereinafter referred to as "coordinate distance") is the distance between one contact portion coordinate and another contact portion coordinate selected from the acquired contact portion coordinates. In other words, the coordinate distance is a length of a line segment formed by connecting two contact portion coordinates with a straight line. In the present embodiment, with reference to all possible combinations made by selecting two contact portion coordinates from the four contact portion coordinates acquired from the smart device 4, coordinate distances are calculated and stored. That is, the lengths of respective line segments included in a plane figure formed by connecting all the contact portion coordinates with straight lines are stored.

The above-described input devices 101 to 104, smart device 4, and server 18 constitute the input system 1. In this input system 1, the server 18 identifies the types of the input devices 101 to 104 placed on the smart device 4, and the smart device 4 outputs information corresponding to the identified input devices 101 to 104. A plane figure formed by connecting the respective contact portion coordinates detected by the smart device 4 with straight lines is similar to a plane figure formed by connecting the centers a to d of the contact surfaces 80a to 80d with straight lines. Thus, in the present embodiment, the similarity ratio between these plane figures is determined, and the line segment lengths (the coordinate distances) in one of the plane figures are converted using the thus-determined similarity ratio. Then, depending on whether the converted line segment lengths (the converted coordinate distances) are substantially equal to the line segment lengths (the contact portion distances) in the other plane figure, the input devices 101 to 104 are identified.

Figure 8:
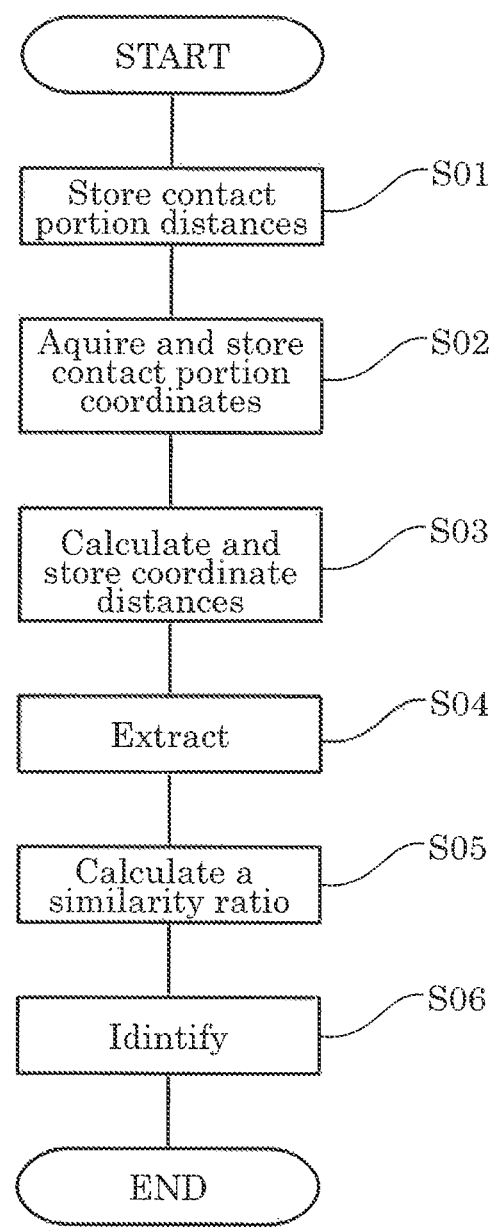
FIG. 8 is a flowchart showing information processing performed by the server.

A method for identifying the input device 101 in the input system 1 will be described below in detail mainly with reference to FIG. 8.

First, as described above, the contact portion distances of each of the input devices 101 to 104 are pre-stored in the auxiliary memory 25 of the server 18 in association with corresponding identification information (S01).

When the input device 101 is placed on the touch panel 5 of the smart device 4, the CPU 14 of the smart device 4 detects contact portion coordinates c1 (x1, y1), c2 (x2, y2), c3 (x3, y3), and c4 (x4, y4) of the contact surfaces 80a to 80d. The detected contact portion coordinates c1 to c4 are transmitted to the server 18 by the wireless communication module 12.

The CPU 19 of the server 18 acquires the contact portion coordinates c1 to c4 via the wired communication module 21, and stores them in the main memory 28 as follows, for example: contact portion coordinates x[1]=x1, x[2]=x2, x[3]=x3, x[4]=x4, contact portion coordinates y[1]=y1, y[2]=y2, y[3]=y3, y[4]=y4 (S02).

Subsequently, regarding the acquired contact portion coordinates, the CPU 19 of the server 18 calculates coordinate distances, which are the distances between the respective pairs of the contact portion coordinates, and stores the thus-calculated respective coordinate distances in the main memory 28 (S03). Specifically, the coordinate distances [1] to [6] are calculated according to the following equations:

$$\text{Coordinate distance } [1] = \sqrt{((x1-x2)^2+(y1-y2)^2)}$$

$$\text{Coordinate distance } [2] = \sqrt{((x1-x3)^2+(y1-y3)^2)}$$

$$\text{Coordinate distance } [3] = \sqrt{((x1-x4)^2+(y1-y4)^2)}$$

$$\text{Coordinate distance } [4] = \sqrt{((x2-x3)^2+(y2-y3)^2)}$$

$$\text{Coordinate distance } [5] = \sqrt{((x2-x4)^2+(y2-y4)^2)}$$

$$\text{Coordinate distance } [6] = \sqrt{((x3-x4)^2+(y3-y4)^2)}$$

Next, the CPU 19 of the server 18 extracts one contact portion distance and one coordinate distance (S04). In the present embodiment, the longest contact portion distance (the length of the line segment bd) is extracted as one contact portion distance, and the longest coordinate distance (hereinafter referred to as "the longest coordinate distance") is extracted as one coordinate distance.

Next, the CPU 19 of the server 18 calculates a similarity ratio (S05). As described above, a plane figure formed by connecting the centers a to d of the contact surfaces 80a to 80d with straight lines is similar to a plane figure formed by connecting the contact portion coordinates with straight lines. Accordingly, the following relational expression is satisfied:

Longest contact portion distance: longest coordinate distance=1:value of similarity ratio On the basis of this relational expression, the CPU 19 determines the similarity ratio by performing the following calculation:

Similarity ratio=(1/longest contact portion distance)× longest coordinate distance Next, the CPU 19 of the server 18 identifies the input device 101 using the calculated similarity ratio (S06). Specifically, the coordinate distances [1] to [6] calculated in the above operation (S03) are multiplied by the reciprocal of the value of the similarity ratio, whereby the coordinate distances [1] to [6] are converted to the same scale as the contact portion distances. Then, the respective converted coordinate distances are compared with the respective contact portion distances stored in association with the identification information to determine whether the converted coordinate distances are substantially equal to the contact portion distances. The term "substantially equal" as used herein encompasses not only the case where the converted coordinate distances are exactly equal to the contact portion distances but also the case where the converted coordinate distances are equal to the contact portion distances within the range of allowable tolerance. The range of the allowable tolerance is set in consideration of the sizes of the coordinate detection regions 8a to 8d within which contact portion coordinates may be detected. That is, when the coordinate detection regions 8a to 8d are broad, the range of the allowable tolerance is set broad, and when the coordinate detection regions 8a to 8d are narrow, the range of the allowable tolerance is set narrow. When the comparison reveals the presence of substantially equal contact portion distances, the identification information associated with the contact portion distances is extracted, and the identification information is transmitted to the smart device 4. On the other hand, when the comparison reveals the absence of substantially equal contact portion distances, information notifying the absence is transmitted to the smart device 4. In this manner, the input device 101 placed on the touch panel 5 is identified.

Upon receipt of the identification information from the server 18, the smart device 4 executes an operation corresponding to the identification information. For example, the smart device 4 displays an image, such as a still image or a video, stored in association with the identification information on the display panel 6. Also, the smart device 4 may output a sound stored in association with the identification information from a speaker 11. Further, the smart device 4 may access a website associated with the identification information. On the other hand, upon receipt of the information notifying the absence from the server 18, the smart device 4 may display an error message on the display panel 6.

In the present embodiment, the similarity ratio is calculated from the longest contact portion distance and the longest coordinate distance, and the coordinate distances are converted using the calculated similarity ratio. This enables comparison between the coordinate distances and the pre-stored contact portion distances of the respective input devices 101 to 104, and the input device 101 is identified on the basis of the result of the comparison. According to the present embodiment configured as above, identification of the input device 101 can be achieved without requiring data concealing display specifications, such as the screen resolution and the screen size, of the smart device 4. Therefore, it is not necessary to provide data concealing display specifications of all models beforehand, and even a newly released smart device 4 having display specifications different from the existing display specifications can identify the input device 101.

Examples based on the above embodiment will be described below. In the following examples, models A to E shown in Table 1 were used as the smart devices 4.

(Server)

As shown in Table 2, a contact portion distance memory table was provided in the server 18 as the contact portion distance memory unit 20. In the contact portion distance memory table, IDs (pieces of identification information) for the input devices 101 to 104 were stored in respective records, and contact portion distances of the respective input devices 101 to 104 were stored in association with the corresponding IDs.

Next, the CPU 19 of the server 18 calculated six coordinate distances from the acquired four contact portion coordinates, and stored them in the coordinate distance memory unit 23 as shown in Table 4.

TABLE 2

| ID | Contact portion distance ab | Contact portion distance ac | Contact portion distance ad | Contact portion distance bc | Contact portion distance bd | Contact portion distance cd |
|---|---|---|---|---|---|---|
| 001 | 30 | 33 | 30 | 32 | 45 | 20 |
| 002 | 30 | 34 | 30 | 24 | 45 | 29 |
| 003 | 30 | 31 | 30 | 14 | 45 | 36 |
| 004 | 30 | 25 | 30 | 21 | 45 | 24 |

The contact portion distance (bd), 45 (mm), was the largest value. Thus, this value was set to the longest contact portion distance. As described above, in the plurality of input devices 101 to 104, the contactors 9a, 9b, and 9d are disposed at the same positions. Accordingly, the contact portion distances ab, ad, and bd were the same among the input devices 101 to 104, and the longest contact portion distances were also the same among the input devices 101 to 104.

(Input Device)

In the following examples, the input device 101 having the contactors 9a to 9d at positions shown in FIG. 5 was used. The contact portion distances of the input device 101 were as follows: ab=30 mm, bc=32 mm, cd=20 mm, ad=30 mm, ac=33 mm, and bd=45 mm.

(Example Using Model A)

Figure 9:
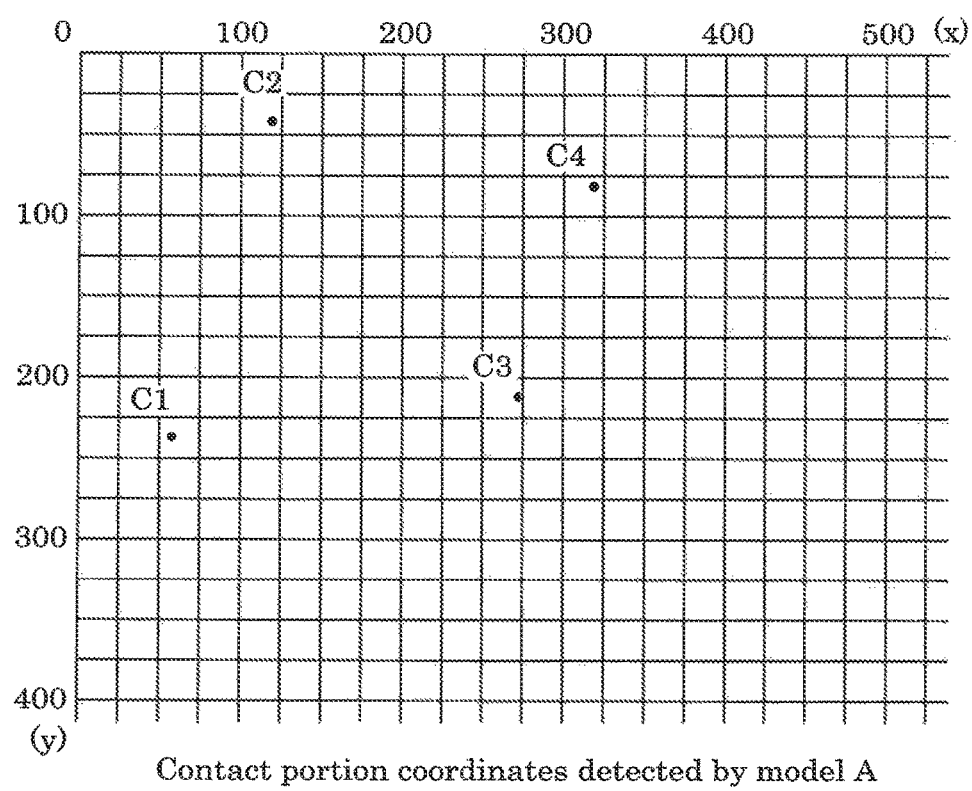
FIG. 9 is a graph showing contact portion coordinates detected in a model A.
Figure 10:
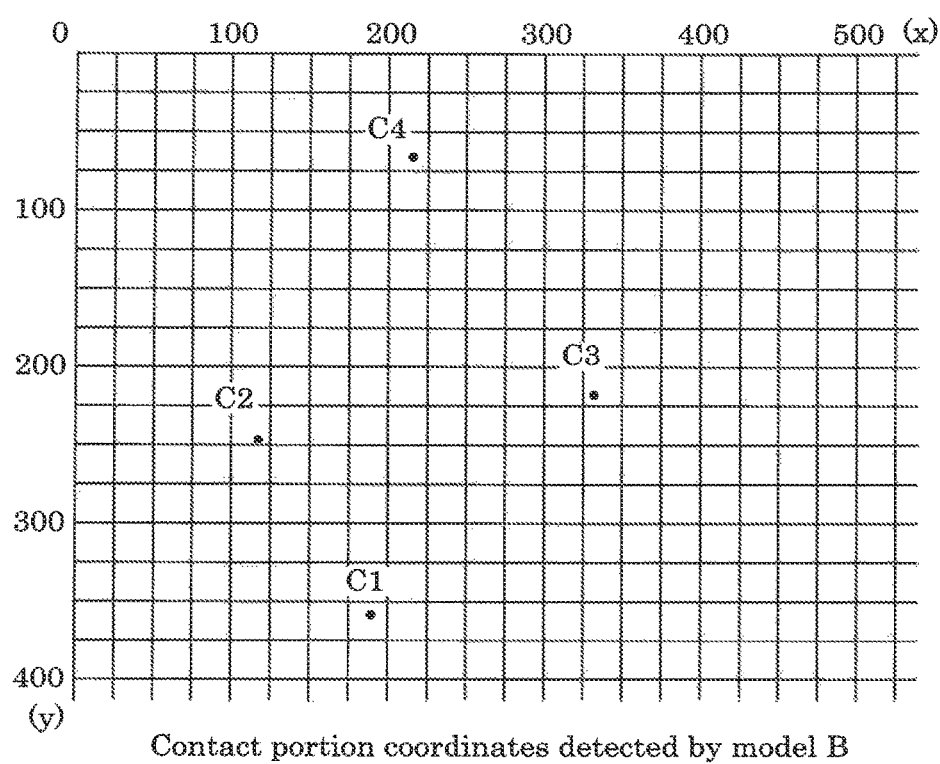
FIG. 10 is a graph showing contact portion coordinates detected in a model B.
Figure 11:
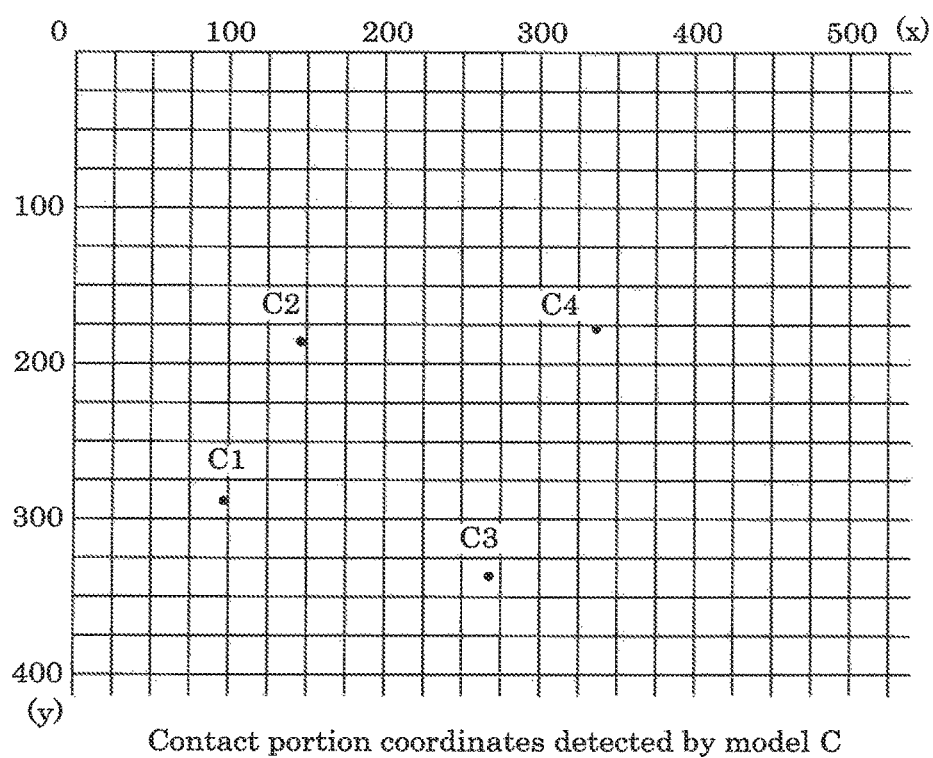
FIG. 11 is a graph showing contact portion coordinates detected in a model C.
Figure 12:
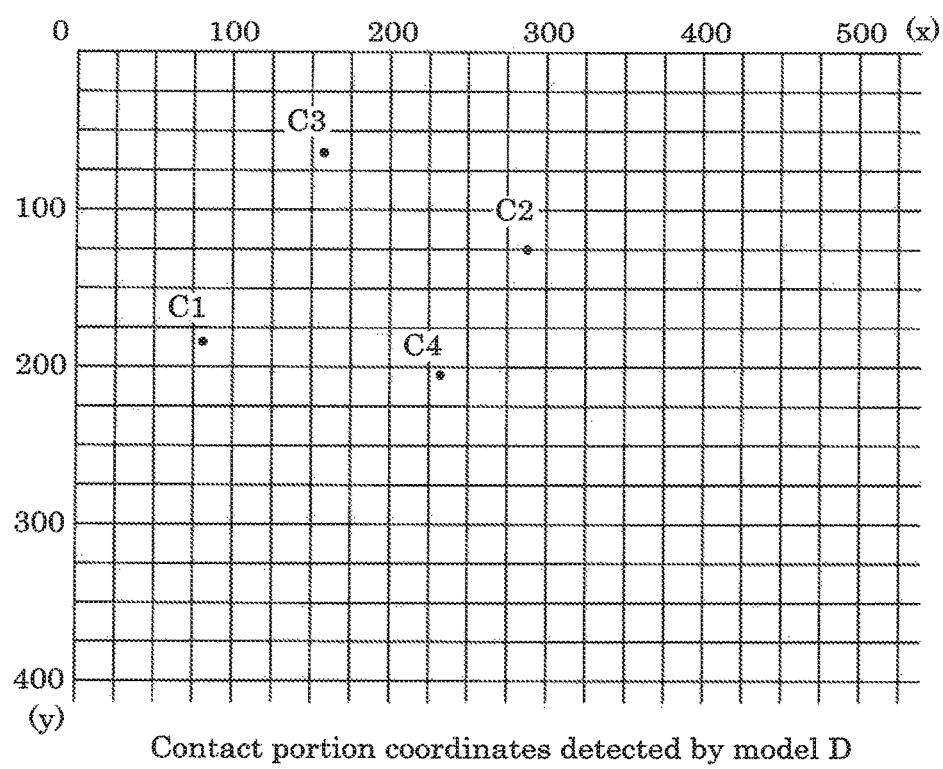
FIG. 12 is a graph showing contact portion coordinates detected in a model D.
Figure 13:
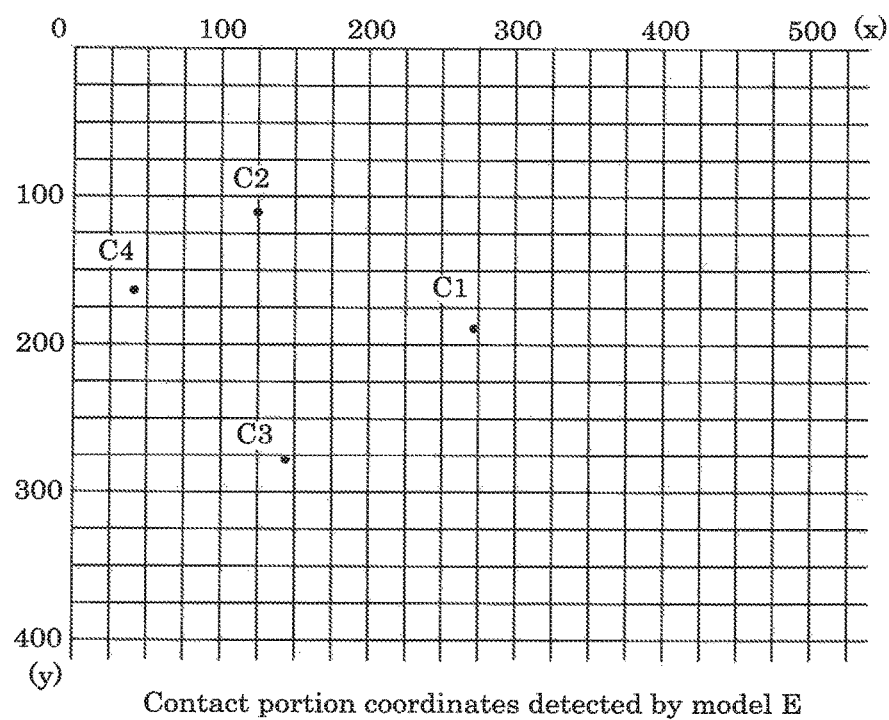
FIG. 13 is a graph showing contact portion coordinates detected in a model E.

When the input device 101 was placed on a touch panel 5 of the model A (Table 1), a touch event was caused by the change in capacitance on the touch panel 5. As a result, contact portion coordinates c1 to c4 shown in FIG. 9 were detected by the CPU 14, and the respective contact portion coordinates were transmitted to the server 18.

The CPU 19 of the server 18 received the contact portion coordinates c1 to c4 from the model A, and stored the respective contact portion coordinates in the coordinate memory unit 22 as shown in Table 3. In Table 3, x[1] to x[4] are variables to contain the x coordinates of the acquired contact portion coordinates c1 to c4, and y[1] to y[4] are variables to contain the y coordinates of the acquired contact portion coordinates c1 to c4.

In Table 4, the coordinate distance [1] is a variable to contain the distance between the contact portion coordinates c1 and c2.

The coordinate distance [2] is a variable to contain the distance between the contact portion coordinates c1 and c3.

The coordinate distance [3] is a variable to contain the distance between the contact portion coordinates c1 and c4.

The coordinate distance [4] is a variable to contain the distance between the contact portion coordinates c2 and c3.

The coordinate distance [5] is a variable to contain the distance between the contact portion coordinates c2 and c4.

The coordinate distance [6] is a variable to contain the distance between the contact portion coordinates c3 and c4.

Each coordinate distance was calculated to one decimal place with the number in the second decimal place being rounded off (rounded up on 5 and rounded down on 4, the same hereinafter applies). The unit of the coordinate distance was "point (pt)".

TABLE 4

| Coordinate distance [1] | Coordinate distance [2] | Coordinate distance [3] | Coordinate distance [4] | Coordinate distance [5] | Coordinate distance [6] |
|---|---|---|---|---|---|
| 203.3 | 217.6 | 306.5 | 225.8 | 204.7 | 137.1 |

Next, the CPU 19 of the server 18 extracted the longest contact portion distance from the contact portion distance memory unit 20 and the longest coordinate distance from the coordinate distance memory unit 23. The CPU 19 then multiplied the reciprocal of the longest contact portion distance by the longest coordinate distance, thereby calculating the similarity ratio (r) of the longest coordinate distance to the longest contact portion distance. The similarity ratio was calculated to one decimal place with the number in the second decimal place being rounded off.

Extracted longest contact portion distance=45 (mm)

Extracted longest coordinate distance (coordinate distance [3])=306.5 (pt)

$r$=(1/45 mm)×306.5 pt=6.81 pt/mm

Next, the CPU 19 of the server 18 multiplied each of the coordinate distances [1] to [6] by the reciprocal of the value of the similarity ratio, thereby updating the value of each coordinate distance. In each of the calculated value, the number in the first decimal place was rounded off. The thus-calculated coordinate distances are shown in Table 5.

TABLE 3

| Contact portion coordinate c1 | | Contact portion coordinate c2 | | Contact portion coordinate c3 | | Contact portion coordinate c4 | |
|---|---|---|---|---|---|---|---|
| x[1] | y[1] | x[2] | y[2] | x[3] | y[3] | x[4] | y[4] |
| 57 | 238 | 121 | 45 | 273 | 212 | 322 | 84 |

TABLE 5

| Coordinate distance [1] | Coordinate distance [2] | Coordinate distance [3] | Coordinate distance [4] | Coordinate distance [5] | Coordinate distance [6] |
|---|---|---|---|---|---|
| 30 | 32 | 45 | 33 | 30 | 20 |

By performing the above-described calculation, the converted coordinate distances are expressed in millimeter, which coincides with the unit (mm) of the contact portion distances. That is, the reciprocal of the value of the similarity ratio serves as a scale conversion value for converting the coordinate distances to the same scale as the contact portion distances.

Next, the CPU 19 of the server 18 compared a plane figure formed by the contact portion distances stored in the contact portion distance memory unit 20 with a plane figure formed by the converted coordinate distances. Specifically, the CPU 19 determined with respect to each record whether the converted values of the coordinate distances [1] to [6] were substantially equal to the values of the respective contact portion distances stored in the contact portion distance memory table. The determination as to whether the converted values were substantially equal to the stored values was performed by comparing each of the converted coordinate distances with all the contact portion distances. As a result, it was determined that the respective converted coordinate distances were substantially equal to the respective contact portion distances associated with ID="001". Specifically, the coordinate distance [1] agreed with the value of the contact portion distance ab, the coordinate distance [2] agreed with the value of the contact portion distance bc, the coordinate distance [3] agreed with the value of the contact portion distance bd, the coordinate distance [4] agreed with the value of the contact portion distance ac, the coordinate distance [5] agreed with the value of the contact portion distance ad, and the coordinate distance [6] agreed with the value of the contact portion distance cd, so that it was determined that the converted coordinate distances were substantially equal to the contact portion distances associated with ID="001". Accordingly, ID=001 was transmitted to the smart device 4.

(Examples Using Models B to E)

The following examples were carried out using the models B to E in the same manner as the model A. The input device 101 was placed on a touch panel 5 of each of the models B to E. As a result, contact portion coordinates c1 to c4 shown in FIGS. 10 to 13 were detected by CPUs 14 of the models B to E, respectively.

The CPU 19 of the server 18 acquired the contact portion coordinates from the models B to E, and stored the contact portion coordinates in the coordinate memory unit 22 as shown in Table 6.

TABLE 6

| Model | Contact portion coordinate c1 | | Contact portion coordinate c2 | | Contact portion coordinate c3 | | Contact portion coordinate c4 | |
|---|---|---|---|---|---|---|---|---|
| | x[1] | y[1] | x[2] | y[2] | x[3] | y[3] | x[4] | y[4] |
| B | 188 | 356 | 117 | 248 | 329 | 220 | 215 | 66 |
| C | 98 | 292 | 147 | 188 | 267 | 338 | 334 | 176 |
| D | 81 | 186 | 287 | 125 | 157 | 66 | 232 | 204 |
| E | 273 | 187 | 125 | 108 | 146 | 277 | 40 | 164 |

Next, the CPU 19 of the server 18 calculated six coordinate distances from the above-described four contact portion coordinates, and stored them in the coordinate distance memory unit 23 as shown in Table 7.

TABLE 7

| Model | Coordinate distance [1] | Coordinate distance [2] | Coordinate distance [3] | Coordinate distance [4] | Coordinate distance [5] | Coordinate distance [6] |
|---|---|---|---|---|---|---|
| B | 129.2 | 195.9 | 291.3 | 213.8 | 206.7 | 191.6 |
| C | 115.4 | 175.1 | 263.0 | 192.1 | 187.0 | 175.3 |
| D | 214.8 | 142.0 | 152.1 | 96.3 | 96.3 | 157.1 |
| E | 167.8 | 155.7 | 234.1 | 170.3 | 101.8 | 154.9 |

Subsequently, the CPU 19 of the server 18 extracted the longest contact portion distance, 45 (mm), and then calculated the similarity ratio (r) for each of the models B to E.

With reference to the model B, the extracted longest coordinate distance was the coordinate distance [3]=291.3 (pt), and the similarity ratio (r) was calculated as follows: r=(1/45 mm)×291.3 pt=6.47 pt/mm.

With reference to the model C, the extracted longest coordinate distance was the coordinate distance [3]=263.0 (pt), and the similarity ratio (r) was calculated as follows: r=(1/45 mm)×263.0 pt=5.84 pt/mm.

With reference to the model D (r), the extracted longest coordinate distance was the coordinate distance [1]=214.8

(pt), and the similarity ratio (r) was calculated as follows: r=(1/45 mm)×214.8 pt=4.77 pt/mm.

With reference to the model E, the extracted longest coordinate distance was the coordinate distance [3]=234.1 (pt), and the similarity ratio (r) was calculated as follows: r=(1/45 mm)×234.1 pt=5.20 pt/mm.

Next, the CPU 19 of the server 18 multiplied each of the coordinate distances [1] to [6] in the models B to E by the reciprocal (scale conversion value) of the value of the similarity ratio, thereby updating the value of each coordinate distance. The updated coordinate distances are shown in Table 8.

TABLE 8

| Model | Coordinate distance [1] | Coordinate distance [2] | Coordinate distance [3] | Coordinate distance [4] | Coordinate distance [5] | Coordinate distance [6] |
|---|---|---|---|---|---|---|
| B | 20 | 30 | 45 | 33 | 32 | 30 |
| C | 20 | 30 | 45 | 33 | 32 | 30 |
| D | 45 | 30 | 32 | 20 | 20 | 33 |
| E | 32 | 30 | 45 | 33 | 20 | 30 |

Next, the CPU 19 of the server 18 examined the sameness between a plane figure formed by the contact portion distances stored in the contact portion distance memory unit 20 and a plane figure formed by the converted coordinate distances [1] to [6] in each of the models B to E. As a result, it was determined that the coordinate distances in each of the models B to E were substantially equal the contact portion distances associated with ID=001, and the ID was transmitted to the smart device 4.

It should be noted that the present invention is not limited to the above-described embodiment and examples. Variations of the embodiment will be described below.

(Variation 1)

For example, the smart device 4 is not limited to a smartphone or a tablet, and may be a mobile communication terminal, a portable personal computer, or a desktop personal computer. That is to say, the smart device 4 is not limited as long as it is a computer with a touch panel 5 that can detect the coordinates of at least three contact points.

(Variation 2)

The communication unit 12 of the smart device 4 and the communication unit 21 of the server 18 may communicate each other according to a communication standard without using the Internet, such as IrDA or Bluetooth. The communication is not limited to wireless communication, and may be wired communication.

(Variation 3)

The server 18 may be a general-purpose personal computer installed within a communication coverage area of the smart device 4.

(Variation 4)

Identification of an input device is not limited to identifying, among the plurality of input devices 101 to 104, the type (identification information) of one input device 101 placed on the touch panel 5. For example, whether a specific input device 101 is placed on the touch panel 5 may be determined. In this case, the contact portion distance memory unit 20 stores only contact portion distances of the specific input device 101, and it is not essential to store identification information. The CPU 19 of the server 18 calculates coordinate distances and a similarity ratio on the basis of contact portion coordinates acquired from the smart device 4, and converts the coordinate distances. Thereafter, the CPU 19 compares the contact portion distances with the converted coordinate distances. Through the above operations, it is possible to determine whether the specific input device 101 is placed on the touch panel 5.

(Variation 5)

One contact portion distance used in calculation of the similarity ratio is not limited to the longest contact portion distance, and may be any contact portion distance that falls under a predetermined condition, such as the second longest contact portion distance, the third longest contact portion distance, or the shortest contact portion distance. Thus, the above-described one contact portion distance preferably is a length that falls under the predetermined condition and is common to the plurality of input devices 101 to 104. Further, one coordinate distance used in calculation of the similarity ratio is a coordinate distance corresponding to the above-described one contact portion distance. That is, one coordinate distance is not limited to the longest coordinate distance, and may be a coordinate distance corresponding to the condition of the above-described one contact portion distance, such as the second longest coordinate distance, the third longest coordinate distance, or the shortest coordinate distance.

(Variation 6)

The method for converting the scale is not limited to multiplying coordinate distances by the reciprocal of the value of the similarity ratio. The scale conversion may be achieved by extracting respective contact portion distances from the contact portion distance memory unit and multiplying each of the extracted contact portion distances by the value of the similarity ratio.

(Variation 7)

In the determination as to whether the converted coordinate distances are substantially equal to the contact portion distances, it is not always necessary to subject all the converted coordinate distances to the determination. For example, a plane figure formed by connecting contact portion coordinates includes two triangles with the longest coordinate distance being their base, and coordinate distances corresponding to sides other than the base among the respective sides constituting the triangles may be subjected to the determination as to whether they are substantially equal to the contact portion distances.

(Variation 8)

Part or the whole of the input device identification program may be downloaded to the smart device 4 and executed by the CPU 14 of the smart device 4. In this case, the auxiliary memory 16 of the smart device 4 includes a program memory unit for storing part or the whole of the input device identification program.

(Variation 8-1)

For example, a program that defines an operation for calculating coordinate distances may be stored in the auxiliary memory 16 of the smart device 4, and the operation may be executed by the CPU 14 via the main memory 17. In this case, the main memory 17 of the smart device 4 stores contact portion coordinates detected prior to the operation.

That is, the main memory 17 serves as a coordinate memory unit for storing contact portion coordinates, and this coordinate memory unit corresponds to the coordinate memory unit 22 of the server 18 in the above embodiment. The CPU 14 of the smart device 4 calculates coordinate distances on the basis of the detected contact portion coordinates without transmitting the detected contact portion coordinates to the server 18 (S03), and transmits the calculated coordinate distances to the server 18.

(Variation 8-2)

A program that defines operations up to the calculation of a similarity ratio may be stored in the auxiliary memory 16 of the smart device 4, and the operations may be executed by the CPU 14 via the main memory 17. In this case, the auxiliary memory 16 of the smart device 4 stores the longest contact portion distances together with the program. Also, the main memory 17 stores coordinate distances calculated in the manner described above in Variation 8-1. That is, the auxiliary memory 16 serves as a longest contact portion distance memory unit for pre-storing the longest contact portion distances. The main memory 17 serves as a coordinate distance memory unit for storing calculated coordinate distances, and this coordinate distance memory unit corresponds to the coordinate distance memory unit 23 of the server 18 in the above embodiment. The CPU 14 of the smart device 4 calculates coordinate distances (S03), and then, calculates the similarity ratio by multiplying the longest coordinate distance selected from the calculated coordinate distances by the reciprocal of the longest contact portion distance (S04). The CPU 14 then transmits the calculated coordinate distances to the server 18 together with the value of the similarity ratio.

(Variation 8-3)

Furthermore, the whole of the input device identification program may be stored in the auxiliary memory 16 of the smart device 4, and the program may be executed by the CPU 14 via the main memory 17. In this case, the auxiliary memory 16 of the smart device 4 pre-stores contact portion distances (S01). That is, the auxiliary memory 16 serves as a contact portion distance memory unit for pre-storing contact portion distances, and this contact portion distance memory unit corresponds to the contact portion distance memory unit 20 of the server 18 in the above embodiment. The main memory 17 stores contact portion coordinates and coordinate distances. The CPU 14 of the smart device 4 calculates coordinate distances (S03) and the similarity ratio (S04) in the above-described manner. Subsequently, the CPU 14 multiplies the respective coordinate distances by the reciprocal of the value of the similarity ratio, thereby converting the coordinate distances. The CPU 14 then compares the converted coordinate distances with the contact portion distances, thereby achieving the identification of the input devices 101 to 104 (S05). The server 18 is not used in the present variation. Therefore, the server 18 is not an essential component in the present invention.

(Variation 9)

In the above-described examples, the unit of the contact portion distances stored in the contact portion distance memory table was "mm". However, the present invention is not limited to this, and the unit of the contact portion distances may be "inch". In this case, the similarity ratio (r) is determined by the following equation:

$$r = (1/\text{one contact portion distance [inch]}) \times \text{one coordinate distance (pt)}$$

The unit of the coordinate distances is converted to "inch" by multiplying the respective coordinate distances by the reciprocal of the value of the similarity ratio. In this manner, the coordinate distances are converted to the same scale as the contact portion distances, thus enabling the coordinate distances to be compared with the contact portion distances stored in the contact portion distance memory table.

Various improvements, modifications, and variations that may become apparent to those skilled in the art may be made in the present invention without departing from the spirit and scope of the present invention. All such embodiments should be construed as falling within the scope of the present invention.

For example, the present invention is also applicable to an electronic stamp system. The electronic stamp system is an authentication system or erasing system using an electronic stamp. As the electronic stamp, the input devices described in the above embodiment, examples, and variations can be used. As an apparatus for performing the authentication and erasing, computers such as the smart devices and the server described in the above embodiment, examples, and variations can be used.

What is claimed is:

1. An input device identification method applicable to an input device comprising at least three contact portions to be in contact with a touch panel, the input device identification method comprising the steps of:
   a) storing a distance between two contact portions in the input device as a contact portion distance for each of a plurality of combinations made by selecting two contact portions from respective contact portions of the input device;
   b) acquiring coordinates of the respective contact portions of the input device placed on the touch panel;
   c) calculating a distance between acquired two coordinates as a coordinate distance for each of a plurality of combinations made by selecting two coordinates from respective acquired coordinates;
   d) calculating a similarity ratio between a shape formed by the respective acquired coordinates and a shape formed by the respective contact portions on the basis of the calculated coordinate distances and the stored contact portion distances; and
   e) identifying the input device in contact with the touch panel by comparing the stored contact portion distances and the calculated coordinate distances after converting either one of the stored contact portion distances and the calculated coordinate distances to the same scale as the other on the basis of the similarity ratio.

2. The input device identification method according to claim 1, wherein
   in the step (a), the contact portion distances of the input device are stored in association with identification information assigned uniquely to the input device, and
   the step (e) further comprises the step of:
      when the contact portion distances and the coordinate distances compared with each other after the conversion are substantially equal to each other, extracting the identification information associated with the contact portion distances.

3. The input device identification method according to claim 1, wherein
   the similarity ratio is a similarity ratio of one of the calculated coordinate distances to one of the stored contact portion distances,
   the one of the contact portion distances is a contact portion distance that falls under a predetermined condition among the contact portion distances stored in the step (a), and the one of the coordinate distances is a coordinate distance corresponding to the predetermined condition among the coordinate distances calculated in the step (c).

4. The input device identification method according to claim 3, wherein
the one of the contact portion distances is a contact portion distance having a largest value, and
the one of the coordinate distances is a coordinate distance having a largest value.

5. An input device identification apparatus applicable to an input device comprising at least three contact portions to be in contact with a touch panel, the input device identification apparatus comprising:
a memory unit configured to store a distance between two contact portions in the input device as a contact portion distance for each of a plurality of combinations made by selecting two contact portions from respective contact portions of the input device;
an acquisition unit configured to acquire coordinates of the respective contact portions of the input device placed on the touch panel;
a coordinate distance calculating unit configured to calculate a distance between two coordinates as a coordinate distance for each of a plurality of combinations made by selecting two coordinates from respective acquired coordinates;
a similarity ratio calculating unit configured to calculate a similarity ratio between a shape formed by the respective acquired coordinates and a shape formed by the respective contact portions on the basis of the calculated coordinate distances and the stored contact portion distances; and
an identification unit configured to identify the input device in contact with the touch panel by comparing the stored contact portion distances and the calculated coordinate distances after converting either one of the stored contact portion distances and the calculated coordinate distances to the same scale as the other on the basis of the similarity ratio.

6. An input system comprising:
a computer with a touch panel; and
an input device comprising at least three contact portions to be in contact with the touch panel,
the computer comprising:
a memory unit configured to store a distance between two contact portions in the input device as a contact portion distance for each of a plurality of combinations made by selecting two contact portions from respective contact portions of the input device;
an acquisition unit configured to acquire coordinates of the respective contact portions of the input device placed on the touch panel;
a coordinate distance calculating unit configured to calculate a distance between two coordinates as a coordinate distance for each of a plurality of combinations made by selecting two coordinates from respective acquired coordinates;
a similarity ratio calculating unit configured to calculate a similarity ratio between a shape formed by the respective acquired coordinates and a shape formed by the respective contact portions on the basis of the calculated coordinate distances and the stored contact portion distances; and
an identification unit configured to identify the input device in contact with the touch panel by comparing the stored contact portion distances and the calculated coordinate distances after converting either one of the stored contact portion distances and the calculated coordinate distances to the same scale as the other on the basis of the similarity ratio.

\* \* \* \* \*